United States Patent
Ota

(10) Patent No.: US 7,965,826 B2
(45) Date of Patent: Jun. 21, 2011

(54) APPARATUS AND METHOD FOR COLLABORATING BETWEEN A VIDEO DEVICE AND A TELEPHONIC DEVICE

(75) Inventor: Takaaki Ota, San Diego, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 1229 days.

(21) Appl. No.: 11/608,769

(22) Filed: Dec. 8, 2006

(65) Prior Publication Data

US 2008/0141302 A1 Jun. 12, 2008

(51) Int. Cl.
*H04M 11/00* (2006.01)
(52) U.S. Cl. .................. 379/102.03; 455/420
(58) Field of Classification Search ............. 379/102.03; 455/415, 420
See application file for complete search history.

(56) References Cited

U.S. PATENT DOCUMENTS

| | | | |
|---|---|---|---|
| 7,257,398 B1 * | 8/2007 | Ukita et al. ............ | 379/102.03 |
| 7,627,341 B2 * | 12/2009 | Wu ........................ | 455/556.1 |
| 2002/0172330 A1 | 11/2002 | Brunelle | |
| 2004/0259537 A1 | 12/2004 | Ackley | |
| 2006/0064472 A1 | 3/2006 | Mirho | |
| 2006/0128307 A1 | 6/2006 | Levien et al. | |
| 2007/0049255 A1 * | 3/2007 | Bhakta et al. .......... | 455/412.2 |
| 2007/0167188 A1 * | 7/2007 | Linden ................... | 455/412.1 |

FOREIGN PATENT DOCUMENTS

| | | |
|---|---|---|
| DE | 102004026021 A1 | 12/2005 |
| JP | 2002149512 A2 | 5/2002 |
| WO | 03019945 A1 | 3/2003 |

OTHER PUBLICATIONS

Salling Software, Salling Clicker for Windows, website, available at http://www.salling.com/Clicker/windows as referenced on http://www.macdevcenter.com.

* cited by examiner

*Primary Examiner* — Stella L Woo
(74) *Attorney, Agent, or Firm* — John P. O'Banion

(57) ABSTRACT

An apparatus and method for collaborating over a short-range communication path between a video output device, such as a television, and a telephonic device which is also configured for simultaneous communication over a long-range communication path. Call progress of the telephonic device is annunciated by the video output device whose functions can be controlled through the telephonic device. Embodiments of the invention describe utilizing the telephonic device in a hands-free mode as well as tracking the relative position of the user based on the position of the telephone. The short-range communications can comprise a Bluetooth™ communications protocol, or similar short-range communications mechanism, which preferably provides a mechanism for identifying the telephonic device as well as its range and/or position.

21 Claims, 2 Drawing Sheets

APPARATUS AND METHOD FOR COLLABORATING BETWEEN A VIDEO DEVICE AND A TELEPHONIC DEVICE

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention pertains generally to television sets, and more particularly to mechanisms for collaborating between a wireless personal telephonic device and a television set.

2. Description of Related Art

Conflicts can arise in the utilization of different electronic devices within a given setting. These mechanisms for interacting with these diverse devices can at times conflict with one another, one such case being the utilization of a television set and a telephone. The inconvenience of a call being in progress (e.g., receiving a call, or making a call) while watching a video stream from a content source (e.g., broadcast or local source content origin) is not difficult to understand. Although the problem exists, it has perhaps not been recognized in view of the different objectives to which the television and phone contexts are directed. Current systems do not provide collaboration between the television set and a telephonic device which are capable of overcoming this conflict.

Accordingly, the present invention teaches a video device which collaborates with a telephonic device so as to increase user convenience. These needs and others are met within the present invention, which overcomes the control deficiencies of previously developed video device apparatus and methods while offering a number of additional benefits.

BRIEF SUMMARY OF THE INVENTION

The present method and apparatus provides for collaboration between a television set, or any video output device, and a telephone configured for supporting two simultaneous communication paths. The invention is configured to alert a user by way of the television set about calls received (or outgoing) from the telephonic device.

As an aid to understanding the present invention, information follows about some of the terms utilized within the specification and claims, however, it is to be appreciated that these are provided for convenience and not as a substitute for other recitations within the specification and claims.

"Television", "TV" or "video device" are terms utilized herein to refer to an electronic device configured for displaying a video stream, or generating a video stream for connection to a video display. A television can be considered to comprise a video output circuit coupled to an integral display, while a similar configuration can be achieved by coupling a video output device with a separate monitor (or input to a television), or other form of video display. The term "video" is utilized herein in its larger context as including video images of any desired resolution (e.g., standard definition (SD), high definition (HD), and the like) preferably accompanied by at least one audio channel. However, it should be appreciated that the present invention can be implemented, as desired, for generating annunciation on either or both the audio and video outputs.

"Telephonic device" is a term utilized herein to refer to personal electronic devices such as telephones, wireless telephone handsets, wireless (cellular) telephones, satellite telephone systems, pagers, personal electronic devices (e.g., personal digital assistants (PDAs), pagers, watches), portable personal computer devices (i.e., pocket PCs), global positioning system devices integrating long-range telephonic communication or satellite telephone systems, and so forth.

"Call progress" is described herein to mean the state (progress) of a telephone call which can be detected by the telephonic device. Call progress tones are utilized in the telecommunications industry for representing many call states, such as ringing, busy, disconnected, off-hook, flash-hook, dialing, on-hook and so forth. It should be appreciated that the term is used herein in a broad sense, inclusive of any state that can be determined by the telephonic device, and not particularly limited to those defined by specific call progress tones. Examples of these additional states include detection of email, detection of receipt of instant messaging, and so forth.

"Bluetooth communications" is a wireless communications protocol that is intended for short-range data and/or voice communications. The range of the Bluetooth protocol is considered short-range and falls into the following classes. Class 3 radios are defined to have a range of up to 1 meter. Class 2 radios, as most commonly found in mobile devices, are defined as having a range of about 10 meters. Class 1 radios are used primarily in industrial use cases and are defined as having a range of up to about 100 meters. The Bluetooth protocol provides a means for registering specific devices as well as for generally determining the range and in some cases the position of the portable device being communicated with. It should be appreciated that the present invention can utilize similar forms of short-range wireless communication without departing from the inventive teachings.

The invention is amenable to being embodied in a number of ways, including but not limited to the following descriptions.

One embodiment of the invention can be generally described as an apparatus for collaborating between a video device and a telephonic device, comprising: (a) means for outputting video content received from a source of video content; (b) means for recognizing the presence of a telephonic device of a selected user; means for communicating over a first, short-range wireless, communication path with the telephonic device of the selected user; and (c) means for controlling the display of video content and annunciating progress of a call received by the telephonic device over the second communication path in response to short-range communications received from said telephonic device over said first communication path. It should be appreciated that the telephonic device of the user is configured to support simultaneous communication over the short-range wireless first communication path as well as over a second, relatively long-range, communication path. In this way communication between the telephonic device and a remote destination take place over a long-range communication path (i.e., conventional telephonic communications path for local or long distance calls) with call progress communicated over a short-range link to the video output device which annunciates the progress of the call and can provide additional functionality.

By way of example and not limitation, the means for outputting video content is selected from the group of video devices consisting of analog TV sets, digital TV sets, set top boxes, video players, fixed media players, digital video recorders (DVRs), removable media players, digital video disc (DVD) players, Blu-Ray™ video disk players, personal computers, video gaming systems, similar devices providing a video output, and combinations thereof. It will be appreciated that the source of video content can receive video content from either internal or external video content sources. Examples of internal content sources include any or all devices which can store content on fixed media storage or removable media storage, or that generate data such as in a gaming device, or combinations thereof. Examples of external content sources include any or all devices which receive and/or convert content from external devices or broadcast content sources. It should be noted that broadcast content can be delivered over radio frequency, Internet, cable, satellite, local network, or similar, and combinations thereof.

A number of different telephonic devices can be supported according to the present invention. By way of example and not limitation, the telephonic device can be any electronic device configured for performing telephonic communication, such as including telephones, wireless telephone handsets, wireless telephones, satellite telephone systems, pagers, personal electronic devices, portable personal computer devices, and combinations thereof.

In one mode of operation, the means for controlling the display of video content and annunciating progress is configured for audio and/or visual announcement of incomings calls being received by the telephonic device. In one mode of operation the means for controlling the display of video content is configured for receiving user control commands from the telephonic device to control the mode of operation and output of the video output device. In one mode of operation the means for controlling the display of video content and annunciating progress is configured for muting audio of the video output device in response to detecting a call which is communicated through the long-distance communication path as received by the telephonic device. In one mode of operation the means for controlling the display of video content and annunciating progress is configured for pausing non-real-time content playback and/or the storage of real-time content within a storage media for later playback in response to the call progress of a call on the long-distance communications received by the telephonic device. In one mode of operation the means for controlling the display of video content and annunciating progress is configured for conveying video and/or audio, accessible from said video output device, to the telephonic device through said short-range communication link, and/or for performing hands-free audio communication through said apparatus to the telephonic device.

By way of example and not limitation, the means for recognizing the presence of a telephonic device of a user recognizes the telephonic device of the user in response to a positive comparison between an identifier received through the short-range communication path from the telephonic device with an identifier for the telephonic device as stored for access by the video output apparatus (e.g., television).

One implementation of the apparatus provides for collaborating between a video device and a telephonic device, comprising: (a) a video output device configured for outputting video content received from a source of video content to a video display; (b) a first communication interface on said video output device, wherein a short-range wireless communication path is created to a telephonic device configured for supporting simultaneous communication over the first, short-range wireless, communication path as well as over a second, long-range, communication path; (c) a computer processor and memory within said video output device; and (d) programming executable from said memory on said computer processor for, (d)(i) recognizing the presence of the telephonic device of at least one specified user, (d)(ii) communicating over a first communication path, including a short-range wireless link, with the telephonic device of the specified user, (d)(iii) controlling the display of video content and/or annunciating progress of a call received by the telephonic device from the long-range communication path and communicated to the video output device over said short-range communications path.

One implementation is a method of collaborating between a video device and a telephonic device, comprising: (a) outputting video content received from a source of video content; (b) recognizing the presence of a telephonic device of at least one selected user in response to communicating over a short-range first communication path with the telephonic device of the selected user; and (c) controlling the display of video content and/or annunciating progress of a call received over the long-range communication path by the telephonic device and communicated through the telephone device to the video device over the short-range communications path. It should be noted that the telephonic device of the user is configured to support simultaneous communication over the first communication path as well as over a long-range, second communication path.

The method can include interfacing between the video device and a telephonic device of a selected user to allow the user to perform telephonic operations in a hands-free mode. The method can include tracking of the position of the selected user in response to short-range communications between the video device and the telephonic device of the user. This for example allows enabling certain functions, such as the hands-free mode, in response to detection of user distance and/or position.

The present invention can provide a number of beneficial aspects which can be implemented either separately or in any desired combination without departing from the present teachings.

An aspect of the invention is to provide for annunciation of telephonic operations (e.g., call progress state or call audio stream) from a video output device.

Another aspect of the invention is to provide for hands-free telephonic operations from a separate video output device.

Another aspect of the invention is to provide control of a video output device from a separate telephonic device of the user.

Another aspect of the invention is to provide for automatic muting of a video device, such as a television, in response to information (i.e., call progress information) received from a telephonic device of one or more users, such as for which telephonic device identification information is available.

Another aspect of the invention is to provide for automatic pausing of a video device, such as a television, in response to call progress within a telephonic device of a specific user.

Another aspect of the invention is to provide for communication between the video device and the telephonic device over a short-range communication link that can operate simultaneously with the long-range link from the telephone to remote parties.

Another aspect of the invention is to provide short-range communications in response to the use of a Bluetooth communication protocol between the video device and the telephonic device.

Another aspect of the invention is to provide for switching a television, or similar video system having a video display, from a stand-by mode (or off) in response to detecting call progress from one or more selected telephonic devices within a desired proximity of the television.

Another aspect of the invention is to provide a mechanism wherein the cellular phone, or other personal electronics of the user, are utilized for controlling more than one video system as the user traverses a space (e.g., a house or other environment) within which the video systems are positioned.

A still further aspect of the invention is to provide convenience factors in response to collaboration between the telephonic device and a television or other video output device.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Figure 1:
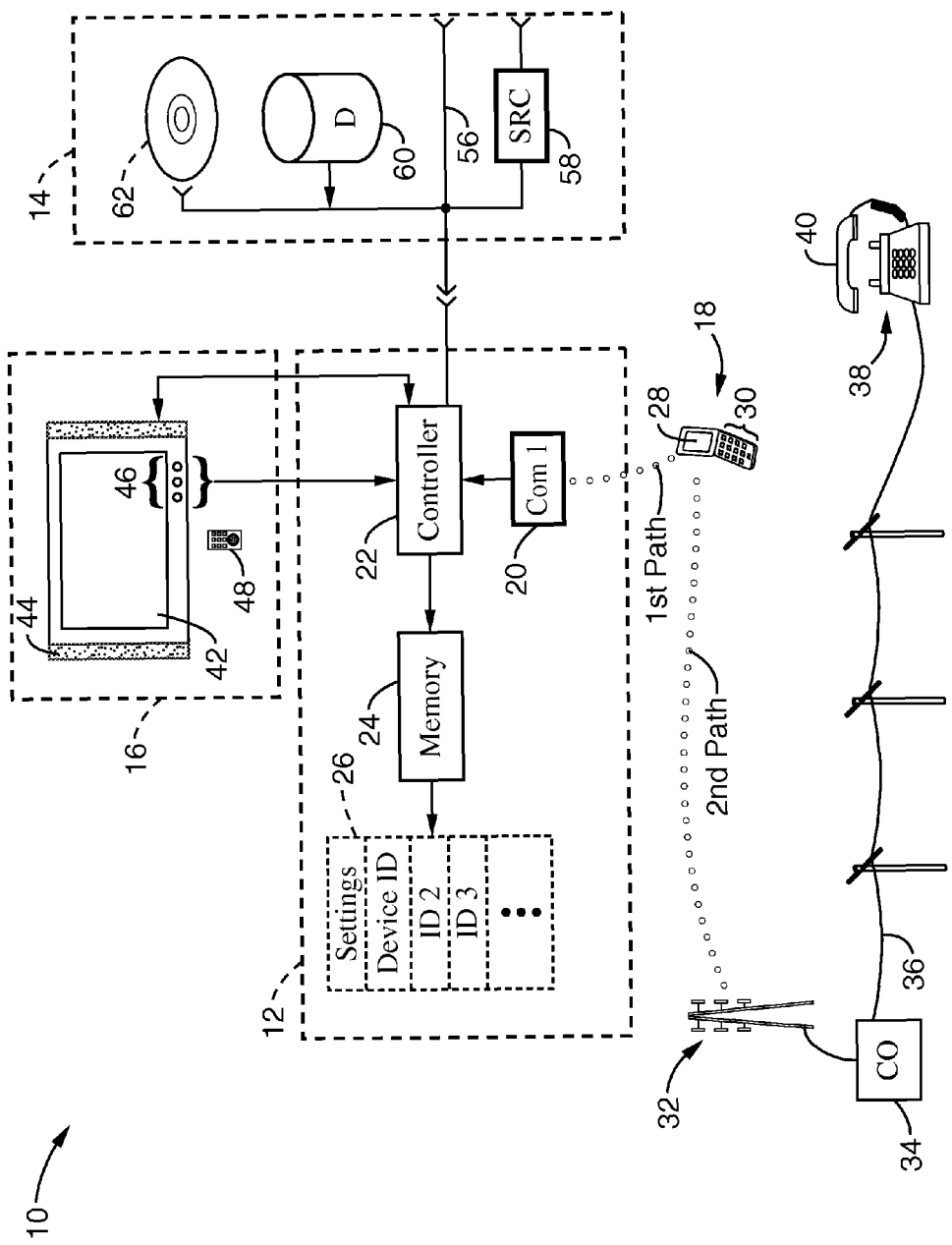
FIG. 1 is a block diagram of an apparatus for collaborating between a video device and a telephonic device according to an embodiment of the present invention.
Figure 2:
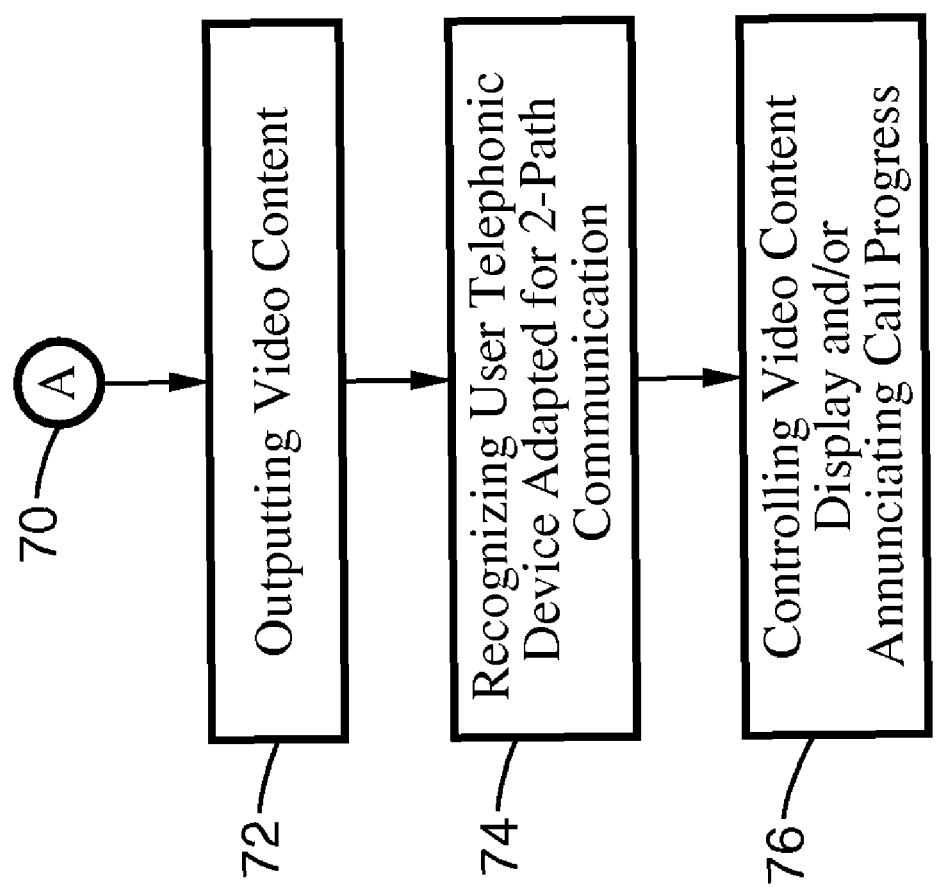
FIG. 2 is a flowchart of a method of collaborating between a video device and a telephonic device according to an embodiment of the present invention.

Referring more specifically to the drawings, for illustrative purposes the present invention is embodied in the apparatus generally shown in FIG. 1 through FIG. 2. It will be appreciated that the apparatus may vary as to configuration and as to details of the parts, and that the method may vary as to the specific steps and sequence, without departing from the basic concepts as disclosed herein.

FIG. 1 illustrates an example embodiment 10 of an apparatus for collaborating between a television and a telephonic device. A video device control circuit 12 is shown for controlling video content from a video source 14 and directed at display 16, in response to collaboration with a telephonic device 18 through a short-range wireless communications port 20. Implementation of the present apparatus requires cooperation between the video device and the telephonic device. The video device must contain circuitry and/or programming for detecting specific telephonic devices and controlling video and/or audio output in response to establishment of a short-range communication link with the telephonic device. The telephonic device must contain circuitry and/or programming directed to providing simultaneous communication over short and long-range links as well as for implementing communication of call progress and providing optional control features.

Control circuit 12 can receive video data from either internal or external video content sources for display on output 16. Internal content sources may separately or in combination comprise fixed media storage, removable media storage, gaming devices, or the like. External content sources comprise content derived from any external sources, such as external devices and broadcast content forms delivered over radio frequency, Internet, cable, satellite, local network, alternative media and combinations thereof.

The wireless communications port 20 is preferably configured for utilizing a Bluetooth protocol which provides communications as well as identification of the telephonic device. In addition, preferred implementations of the Bluetooth protocol provide information about the relative position of the telephonic device in relation with control circuit 12.

A control circuit 12 is seen to contain a controller 22 coupled to a data repository, such as memory 24, which is configured for maintaining information 26 about the video device as well as selected telephonic devices of the user (e.g., those for which the user enters registration information). Data 26 is exemplified as being retained in memory 24 as settings and device identifiers. It will be appreciated that the functioning of the system can be modified as desired by these settings. The information about device IDs preferably provides information on how the presence of these devices is to be identified, for example the use of device IDs for each selected device.

The telephonic device 18 being communicated with is shown by way of example in this figure as a cellular telephone, although it should be appreciated that a number of telephonic devices which are configured for simultaneously supporting two communication paths, and more particularly both a short and long-range communication path, are similarly applicable. A screen 28 and user interface 30 are shown on telephonic device 18 which allows users to control the receipt and placing of calls to and from device 18 to remote devices and persons. In order to illustrate the dual-communication nature of the telephonic device it is seen that a first communication path (short-range) is shown between telephonic device 18 and communication port 20 of control circuit 12, while a second communication path (long-range) is shown between telephone device 18 and a cellular tower 32 coupled to telephonic infrastructure, exemplified here as a telephone central office (CO) 34 configured for communicating to remote parties over wireless means or wired lines. By way of example, wired lines 36 are shown coupling the central office (CO) to a conventional telephone device 38 with handset 40.

The collaboration apparatus and methods of the present invention can be integrated within any video apparatus supporting a video display or a video output configured for display. Examples of these video apparatus comprise any of the following devices and combinations: analog TV sets, digital TV sets, set top boxes, video players, fixed media players, digital video recorders (DVRs), removable media players, digital video disc (DVD) players, personal computers, video gaming systems, and other electronic systems configured for displaying video (e.g., television) or generating a video output for being displayed on a video display device (e.g., video monitor). In the figure a television 16 is shown by way of example, having a screen 42, optional speakers 44 (alternatively sound may be directed through separate speakers or a sound system), manual controls 46 and a wireless remote control 48. For the sake of simplicity, the video device will be described as a television set, although the invention can be implemented with other types of video devices.

The present invention allows for the display of content which is received from or generated from, either internal or external video content sources, which are directed to the video output as modified by the collaboration between the telephone and the video device. Examples of internal video content sources comprise fixed media video devices, removable media video devices, gaming devices, and the like taken separately or in combination. Examples of external content sources comprise broadcast content forms such as radio frequency, Internet, cable, satellite, local network, telephonic devices and combinations thereof. The content sources within group 16 can comprise any of the following: telephone 18, content input 56 (e.g., IP connection, USB, and so forth), converted content input 58 (e.g., protocol conversion, cable modem, satellite system, and so forth), fixed data store 60 (e.g., memory, or disk drive), and/or removable media device 62 (e.g., memory cards, CD, DVD, Blu-Ray™, and so forth). It will be appreciated that the "content" received from the telephonic device is preferably received in the form of commands and data that are converted by the video device which can display text and or graphics on the display in response to the received commands or data.

Controller circuit 22 incorporates one or more computational elements, such as microcontrollers, microprocessors, digital signal processors, or similar devices which can execute programming, such as for performing the methods taught herein. The operation of controller circuit 22 is performed in response to stored data, such as in memory 24, which contains settings, device identifiers, collaboration preferences and so forth. It should also be appreciated that the programming for the methods taught herein can be provided in the form of instructions, media, downloads and so forth, which can be executed on video devices which have a capability for detecting the presence of a supervisory person, or which can be augmented with this capability.

The apparatus, and in particular controller circuit 22 within the embodiment shown, are configured to perform a number of functions within the invention. It should be appreciated that these functions can be alternatively performed through the use of other circuits and systems. For example, controller circuit 22 provides a means for outputting video content from a source of video content, such as converting data from a stored format into an S-video, composite video, RF output, or other video formats for driving a video display.

The controller also provides a means for recognizing the presence of a telephonic device of a selected user, such as recognizing that it is within range and that it is the one or more devices selected to operate with the system. It will be recognized that the video system may be setup to collaborate with a single telephonic device, or a group of telephonic devices, or selected devices within a group of telephonic devices in response to conditions (e.g., time, range of device, position within the room, presence of other devices, and so forth). In one embodiment, the telephonic devices are identified based on their identification number, although other identification mechanisms may be similarly utilized. The controller directs communications with the telephonic device over a means for short-range communication, such as shown as a communication port. The telephonic device itself is configured for simultaneous communication over two communications paths, preferably a short-range and long-range communications path.

The controller is adapted to perform a number of collaboration functions, either separately or in combination with one another. In a preferred implementation these means are performed by programming executing on a processing element. Following is a list of functions that can be executed in one or more modes or implementations of the invention.

Annunciation of Call Progress

The progress of calls to, or from, the presently associated telephonic device (i.e., specified device within range and fitting parameters for which collaboration is to be performed) are annunciated by the video device. This call progress annunciation aspect include displaying information about received calls, the following given by way of example. (1) Audible and/or visual output in response to ringing of selected telephonic devices which are within range. In one mode the display shows a graphic or textual indication, such as on the edge or corner of the screen, when the telephonic device is ringing so as to provide a ringing signal that is less obnoxious. (2) Displaying caller ID information for calls being received by select telephonic devices. (3) Displaying call status information (e.g., ringing, busy, out-of-service) and so forth.

Interaction with Call in Progress

In this aspect of the invention, information received from the presently associated telephonic device (e.g., in response to incoming or outgoing calls) is used by the video device to control functions, or conversely information received through the video device is communicated back out to the telephonic device. Examples of this aspect include each of the following functions separately or in combination. (1) Activating the screen for annunciation of call progress information. (2) Muting audio on the video device in response to call progress. (3) Pausing playback of non-real-time content (e.g., DVD, Blu-Ray™ disks and so forth). (4) Activating storage for digital video recorders and similar when viewing real-time content (i.e., broadcast content). (5) Playback of material stored on or being received by the telephonic device over the video device. In this context or mode, any material, including data files, can be received from the telephonic device for display or storage through the video device. (6) Hands-free operation wherein sound, and/or video, is (6)(i) received from the telephonic device and output on the audio output, and optionally the screen, and (6)(ii) captured by the video device to the telephonic device for communication over its long-range communications path. (7) User tracking, wherein the range and position of a specific telephonic device is used to regulate aspects of controlling the video device. An example of this mode is altering the volume of the television in response to the range and position of the user, or determining whether to proceed with video device controls (e.g., muting, call progress annunciation) if the user is not in the vicinity.

It should be appreciated that device tracking can also benefit from sensing the physical presence of individuals within the vicinity (i.e., watching the display associated with the video system). If available, information about persons "viewing" the video content, or otherwise interacting with the video device, is used by the programming to modulate system response. For example if only one user is present then it would be permissible to pause the programming in response to receiving a call. However, if many persons were watching the programming then this would be a less attractive action. The programming, preferably in concert with stored parameters reflecting user desires, determines whether the collaboration feature should still be active based on the number of persons present. This aspect can be implemented readily in response to analyzing infrared imaging, detecting sounds, electric field sensing and other techniques which will be recognized by one of ordinary skill in the art.

FIG. 2 illustrates a generalized flow of the present method of collaborating between a television, or other video device, and a telephonic device having at least two separate communication channels (paths). In the flow of processing the video content, such as through step 70, video content is output as represented by block 72. In block 74 the video device attempts to communicate with any local devices according to its short-range communication path and recognizes telephonic devices within the vicinity. The collaboration aspects are performed in response to recognizing that a telephonic device is nearby that is adapted for two-path communication. In block 76 the video content is controlled and/or call progress is annunciated according to the one or more aspects of the invention.

It should be noted that although step 72 describes outputting video content, one embodiment of the television set is awakened from a stand-by or off mode (no video output) to perform functions according to the invention.

The annunciation and interaction aspects of the invention can be performed separately or in various combinations, as few examples of implementation for these aspects is described below.

Audio Muting in Response to Incoming Call

Referring to the generalized implementation of FIG. 1, programming executed on controller 22 from memory 24 performs the steps necessary for muting the television audio in response to receipt of an incoming call. Upon detecting the ringing signal (i.e., call progress tone) for the incoming call over the long-range communication path (path 2) for the telephonic device, the ringing status is communicated over the short-range communication path (path 1) to communication port 20 and to controller 22. It will be appreciated that the video device preferably has previously established that telephonic device 18 is within range. Alternatively, the presence and proximity of telephonic device 18 can be established when the ringing status is communicated.

Telephonic device identification is communicated in combination with the ringing status (i.e., as part of call progress communication). Programming of the video device, according to the present invention, searches a list (i.e., or any desired data structure) to match the identification information. When found, then the programming preferably extracts the preference settings to be used for this particular telephonic device. It will be appreciated that a set of preferences can also apply when the device identifier does not match any of the known devices (i.e., wherein a device is considered to be "known" as information about it is found on the list). If the preferences indicate that the audio is to be muted in response to ringing, then controller 22 blocks the audio output, or superimposes a sound on the existing audio, or substitutes another audio stream. For example, a ringing sound (e.g., as selected from a plurality of ringing sounds) can be output which replaces the original audio for the content being output. In addition, if the preference settings for this device indicate, then the content stream can be paused when the content being played back is from a storage means (e.g., DVD, Blu-Ray, disk drive), or stored in a video recorder buffer (e.g., DVR) when the content being played is live content (e.g., broadcast content where pausing leads to loss of content).

Additional information can also be received over the short-range link from the telephonic device at this time, such as caller ID information, which in response to preference settings is displayed on the screen, preferably in both its numerical form as well as providing a textual or graphic representation associated with that number as generated from either the telephonic device or by the video device itself. It should be noted that the preferences may include information about how different categories of incoming caller ID numbers are to be treated (e.g., determining which calls are to be passed through to the television) as the user may want to limit content viewing interruptions. It will be appreciated that if a caller ID function is available it can be checked prior to muting of the audio content or of displaying ringing on the video device.

If the user answers the call from the telephonic device, then call progress status information is sent to video device 12 in response to this new status. According to user preference, the content control (e.g., muting, pausing, storage, and so forth) can continue or be terminated, while the user continues with their call in a conventional manner.

If the video device is configured with a hands-free mode (e.g., microphone circuitry) then the user may elect to use the hands-free mode to answer the incoming call. The selection of the hands-free mode may be determined in response to preference and conditions, and/or it may be based on a response from the user, such as detecting a particular voiced response (e.g., "answer", "don't answer", "voice-mail", "hang-up") which is decoded to determine response. If the call is to be answered in a hands-free mode then the microphone is activated and speech is communicated through controller 22 (or a separate audio path) through wireless port 20 over a first communication path, preferably a short-range communication path (i.e., Bluetooth), to the specific telephonic device which then retransmits the audio over the long-range communication path to the destination. Audio received from the destination is similarly communicated in the reverse direction and output by the video device and played over the speakers. Preferably either simplex audio is utilized, or other measures, such as a directional microphone are utilized to prevent audio feedback problems.

In addition, if optional camera hardware is in place and the user preferences dictate its use for a given telephonic device, or call, or in response to user instruction, then images can be communicated in either direction through the combination of long-range path, telephonic device, and short-range path.

Video Device Control from Telephonic Device

In one mode of the invention, the video device can be controlled from the telephonic device, therein providing additional collaboration aspects. For example, the user may enter a key sequence, or use a voice command, on the telephonic device which translates (e.g., in response to programming which executes on the processor of the telephonic device) to a command string that is communicated over the short-range path to controller 22. In response to which controller 22, executes the command such as changing channels, volume, program source, muting, pausing, storing incoming content, retrieving content (e.g., locally or from a remote storage means) or any other desired functions. This control can be in response to call progress as described previously or in response to commands entered by the user from the telephonic device.

In one mode of the invention, the telephonic device (e.g., Bluetooth-equipped cellular phone) is configured for providing user identification (e.g., in response to possession, biometric ID, or other identifier means). In this mode the system is configured for tracking the location of the viewer from one room to another room, or moving through communication zones as defined in any detectable manner. In response to this movement, the short-range (e.g., Bluetooth) communication connection is disengaged from one video output device (e.g., TV) and engages another video output device (e.g., TV). Once the transfer takes place, the video device at the new location (assuming it is compatible) is controllable in the same manner described previously.

In addition, a system can be selected, such as in response to user preference settings or input, wherein the viewing experience is transferred from the prior environment to a new environment. The viewing experience can include any desired selectable characteristics, although the most notable are media source selection (e.g., channel), audio volume, favorite channels, and options such as closed-captioning.

As the user leaves the first environment they may decide to turn off, or otherwise put the TV in a standby mode. Typically, this user input would not be considered a "setting" that the system would duplicate in the new environment. Depending on user preferences, the TV (or other video device) in the first environment, can be automatically muted, put in standby mode, turned off, or otherwise automatically configured to a desired state by the system in response to detecting the movement of the user out of the vicinity.

The means for transferring environmental settings can be implemented in any desired way without departing from the teachings of the present invention. In a first implementation, the TV (or other video device) in the first environment is configured for communicating with the TV (or other video device) located in the second environment, for example across a power-line network, home network, wireless network, or the like. The environmental characteristics in this example are preferably broadcast to other active devices when the user leaves the first environment, or alternatively a request for this data can be sent from the second environment when the user enters this space.

In a second implementation, information about the settings can be communicated to, and stored within, the telephonic device over the short-range communication path in response to updating of these characteristics, such as whenever the user changes the channel, volume or other selected settings. Upon entering the new environment, these characteristics are sent as parameters from the telephonic device being detected in the new environment to the TV, or other video device, present in this new environment.

It will be appreciated that in either of the preceding examples, the user can enjoy a more seamless viewing experience as they traverse a set of rooms or other communication zones. It should also be noted that the user need not leave the "physical range" of one device and enter the "physical range" of another, in that one mode of the system allows the system to detect relative proximity (e.g., directly, or in response to mapping, or user input) to determine within which environment the user should be considered to be operating.

It should be appreciated that video device control by the telephonic device does not preclude control of the video device through manual means 50 or remote control devices 48 from which commands can be received.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for collaborating between a video device, a video content source, and a telephonic device, comprising:
   means for outputting video content received from a source of video content;
   means for recognizing the presence of a telephonic device of a selected user;
   means for communicating over a first, short-range wireless, communication path with the telephonic device of the selected user;
   wherein the telephonic device of said user is configured to support simultaneous communication over said first communication path as well as over a second, long-range, communication path; and
   means for controlling the display of video content and annunciating progress of a call received by the telephonic device over the second communication path in response to short-range communications received from said telephonic device over said first communication path and for pausing of non-real-time content playback and/or the storage of real-time content within a storage media for later playback in response to the call progress of a call on the long-distance communications received by the telephonic device.

2. An apparatus as recited in claim 1, wherein said apparatus comprises a television set configured for communication over the short-range wireless link of said first communication path with a telephonic device.

3. An apparatus as recited in claim 1, wherein said means for outputting video content is selected from the group of video devices consisting of analog TV sets, digital TV sets, set top boxes, video players, fixed media players, digital video recorders (DVRs), removable media players, digital video disc (DVD) players, personal computers, video gaming systems and combinations thereof.

4. An apparatus as recited in claim 1:
   wherein said source of video content receives internal or external video content sources;
   wherein said internal content sources comprises devices which can store content in fixed media, removable media or a combination of fixed and removable media;
   wherein said external content sources comprise devices which receive and/or convert content from external devices, broadcast content sources or a combination of external devices and broadcast content sources; and
   wherein said broadcast content can be delivered over radio frequency, Internet, cable, satellite, local network, and combinations thereof.

5. An apparatus as recited in claim 1, wherein the second communication path comprises a long-range wireless communication link.

6. An apparatus as recited in claim 1, wherein said short-range wireless communication operates under FCC class 1, class 2, or class 3 with respect to communication range.

7. An apparatus as recited in claim 1, wherein said short-range wireless link comprises communications performed according to a Bluetooth protocol standard.

8. An apparatus as recited in claim 1, wherein the telephonic device can be selected from the group of electronic devices configured for performing telephonic communication consisting of: telephones, wireless telephone handsets, wireless telephones, satellite telephone systems, pagers, personal electronic devices, portable personal computer devices, and combinations thereof.

9. An apparatus as recited in claim 1, wherein said means for controlling the display of video content and annunciating progress is configured for audio and/or visual annunciating of incoming calls received by the telephonic device.

10. An apparatus as recited in claim 1, wherein said means for controlling the display of video content is configured for receiving user control commands from the telephonic device to control the mode of operation and output of the video output device.

11. An apparatus as recited in claim 1, wherein said means for controlling the display of video content and annunciating progress is configured for muting audio of said video output device in response to detecting a call through the long-distance communication path as received by the telephonic device.

12. An apparatus as recited in claim 1, wherein said means for controlling the display of video content and annunciating progress is configured for interfacing between the video device and a separate telephonic device of a selected user to allow the user to perform telephonic operations through the video device in a hands-free mode.

13. An apparatus as recited in claim 1, wherein said means for controlling the display of video content and annunciating progress is configured for communicating video and/or audio accessible from said video output device to the telephonic device through said short-range communication link.

14. An apparatus as recited in claim 1, wherein said means for recognizing the presence of a telephonic device of a user recognizes the telephonic device of the user in response to a positive comparison between an identifier received through the short-range communications path from the telephonic device with an identifier for the telephonic device as stored within said apparatus.

15. An apparatus for collaborating between a video device, a video content source, and a telephonic device, comprising:
 a video output device configured for outputting video content received from a source of video content to a video display;
 a first communication interface on said video output device;
 said first communication interface is configured to create a short-range wireless communication path to a telephonic device configured for supporting simultaneous communication over said first, short-range wireless, communication path as well as over a second, long-range, communication path;
 a computer processor and memory within said video output device; and
 programming executable from said memory on said computer processor for,
  recognizing the presence of the telephonic device of at least one specified user,
  communicating over a first communication path, including a short-range wireless link, with the telephonic device of the specified user,
  controlling the display of video content and annunciating progress of a call received by the telephonic device from the long-range communication path and communicated to the video output device over said short-range communications path, and for pausing of non-real-time content playback and/or the storage of real-time content within a storage media for later playback in response to the call progress of a call on the long-distance communications received by the telephonic device.

16. An apparatus as recited in claim 15, wherein said video output device comprises a television set incorporating a video display.

17. An apparatus as recited in claim 15, wherein said first communication interface operates according to a Bluetooth communication protocol.

18. A method of collaborating between a video device, a video content source, and a telephonic device, comprising:
 outputting video content received from a source of video content;
 recognizing the presence of a telephonic device of at least one selected user in response to communicating over a short-range first communication path with the telephonic device of the selected user;
 wherein the telephonic device of the user is configured to support simultaneous communication over said first communication path as well as over a long-range, second communication path; and
 controlling the display of video content and annunciating progress of a call to, or from, the telephonic device over the long-range communication path and communicated through the telephone device to the video device over the short-range communications path, and for pausing of non-real-time content playback and/or the storage of real-time content within a storage media for later playback in response to the call progress of a call on the long-distance communications received by the telephonic device.

19. A method as recited in claim 18, further comprising interfacing between the video device and a separate telephonic device of a selected user to allow the user to perform telephonic operations through the video device in a hands-free mode.

20. A method as recited in claim 18, further comprising tracking of the position of the selected user in response to short-range communications between the video device and the telephonic device of the user.

21. A method as recited in claim 20, further comprising transferring of viewing characteristics, from said video device at a first location to another video device at a second location, in response to a determination based on said tracking that the user has left the first location and entered the second location.

\* \* \* \* \*